(12) United States Patent
Na et al.

(10) Patent No.: US 12,266,006 B2
(45) Date of Patent: Apr. 1, 2025

(54) PROVIDING AND DISPLAYING SEARCH RESULTS IN RESPONSE TO A QUERY

(71) Applicant: Maplebear Inc., San Francisco, CA (US)

(72) Inventors: Taesik Na, Seattle, WA (US); Vinesh Reddy Gudla, South San Francisco, CA (US); Xiao Xiao, San Diego, CA (US)

(73) Assignee: Maplebear Inc., San Francisco, CA (US)

( * ) Notice: Subject to any disclaimer, the term of this patent is extended or adjusted under 35 U.S.C. 154(b) by 256 days.

(21) Appl. No.: 18/159,357

(22) Filed: Jan. 25, 2023

(65) Prior Publication Data

US 2024/0249335 A1    Jul. 25, 2024

(51) Int. Cl.
| G06Q 30/06 | (2023.01) |
| G06F 16/9535 | (2019.01) |
| G06Q 30/0201 | (2023.01) |
| G06Q 30/0601 | (2023.01) |

(52) U.S. Cl.
CPC ..... *G06Q 30/0631* (2013.01); *G06F 16/9535* (2019.01); *G06Q 30/0201* (2013.01)

(58) Field of Classification Search
CPC ............ G06Q 30/0631; G06Q 30/0621; G06F 16/9535
USPC ........................................................ 705/26.7
See application file for complete search history.

(56) References Cited

U.S. PATENT DOCUMENTS

| 10,706,450 | B1 * | 7/2020 | Tavernier | ............ G06F 16/9535 |
| 11,151,203 | B2 | 10/2021 | Natchu | |
| 11,216,867 | B2 * | 1/2022 | Morin | .................... G06N 20/00 |
| 2021/0174164 | A1 * | 6/2021 | Hsieh | ................. G06Q 30/0282 |
| 2021/0240722 | A1 * | 8/2021 | Puthenputhussery | ........................ G06F 16/24578 |
| 2021/0365500 | A1 * | 11/2021 | Gunaselara | ........... G06F 40/284 |

FOREIGN PATENT DOCUMENTS

CN        106663114 B  *  9/2020  ......... G06F 16/9535

OTHER PUBLICATIONS

Article, "U.S. Patent and Trademark Office Receives Google LLC's Patent Application for Ranking Image Search Results Using Machine Learning Models"; Global IP News. Optics & Imaging Patent News [New Delhi] Jun. 25, 2020] retrieved from Dialog o Nov. 21, 2024 (Year: 2020).*

* cited by examiner

*Primary Examiner* — Yogesh C Garg
(74) *Attorney, Agent, or Firm* — Fenwick & West LLP (57) ABSTRACT

An online system displays search results in response to a query by receiving a query from a customer. An online system accesses a set of candidate items and computes a relevance score and personalization score for each item. The online system computes the relevance score based on query data and item data and may normalize the relevance score. The online system computes the personalization score based on item data, such as an item embedding, and user data, such as a user embedding. The online system computes a query specificity score and adjusts the personalization score with the query specificity score such that generic queries have high personalization scores and specific queries have low personalization scores. The online system combines the relevance and personalization scores for each candidate item into a ranking score and displays the candidate items to the customer based on their ranking scores.

20 Claims, 8 Drawing Sheets

PROVIDING AND DISPLAYING SEARCH RESULTS IN RESPONSE TO A QUERY

BACKGROUND

Online systems provide services to users that interact with the online systems through their user devices. For example, an online concierge system allows users to order items to be provided to them. Users may transmit search queries to the online concierge system. These queries include free text indicating content the user is interested in having provided to them by the online system. For example, a user who wants to see bread items that are gluten free from an online concierge system may input "gluten free bread" as free text for a search query. The user's device transmits the user's queries to the online system, and in response, the online system transmits search results to the user's device for presentation to the user.

In addition to providing search results that are relevant to a user's search query, online systems may also personalize search results to the user. For example, if a user has previously interacted with a piece of content (e.g., ordered a particular sourdough bread item), an online concierge system may rank that piece of content more highly for presentation to the user when the user queries the online system in the future. Thus, an online concierge system generally provides a better user experience when the user's search results are personalized by helping the user find content with which they are more likely to interact.

However, results for a search query may be over-personalized to a user such that the personalization is counter-productive. A user may search for new content that is different from the content that the user has interacted with in the past. However, if the online system over-personalizes search query results, the online system may continually provide the user with the same items, even if the user is looking for something different. For example, if a user who has previously bought sourdough bread items inputs a search query for "sourdough crackers," an online concierge system may present the sourdough bread items as the result. Though the result is personalized (i.e., corresponds to what the user bought in the past), it is not relevant to what the user was searching for (i.e., crackers, not bread).

Thus, online systems must balance how much they personalize search query results with the relevance of the results to the provided search query.

SUMMARY

In accordance with one or more aspects of the disclosure, an online system displays items to a user in search results based on how relevant the items are to a search query and based on how relevant the items are to the user, where the relevance of the items to the user is weighted according to how specific the search query is.

In some embodiments, the online system receives a search query from a user of an online system, where the search query includes free text indicating items of interest to the user. The online system then accesses candidate items from a database that potentially match the search query. The online system may calculate a relevance and personalization score for each candidate item in the set. A relevance score is a score that represents how relevant an item is to the user's search query and a personalization score is a score representing an affinity of the item to the user who submitted the search query. The online system balances the relevance score and the personalization score of each candidate item to rank the candidate items for display to the user in search results.

To adjust the personalization of search results based on the search query, the online system computes a query specificity score, which is a measure of the specificity of the search query. For example, an online concierge system may compute a relatively low query specificity score for the search query "snacks" and a relatively high query specificity score for the search query "organic cheddar cheese crackers." The online system may compute the query specificity score based on the inverse of an entropy score. The online system may calculate the entropy score based on an uncertainty in interaction outcomes across items in the candidate set, where an interaction outcome is an interaction between a user and an item presented in search results for the given search query.

The online system uses the specificity score to adjust the personalization score such that the online system displays less personalized search results for more specific queries, and more personalized search results for less specific queries. For example, the online system may adjust the personalization score inversely with the query specificity score. Thus, when the query is more specific, indicating that the user may have a particular item in mind, the personalization score contributes less to an item's overall score and the system displays items that are more relevant to the query, rather than personalized to the user. When the query is less specific, the personalization score contributes more to an item's overall score and the system displays more personalized items to the user. The online system combines the relevance score and adjusted personalization score for each candidate item into a ranking score such that the ranking scores can be used to rank the candidate items against one another. The online system may then display the candidate items to the user based on their ranking scores.

Through using embeddings in the scoring and ranking process, the online system is able to rely on pre-existing machine learning models to display search results in a way that balances the relevance of items with personalizing results to a user. As a result, the online system does not need to create new training data, retrain existing models, or create new models, ultimately saving on time and processing power.

DETAILED DESCRIPTION

Figure 1:
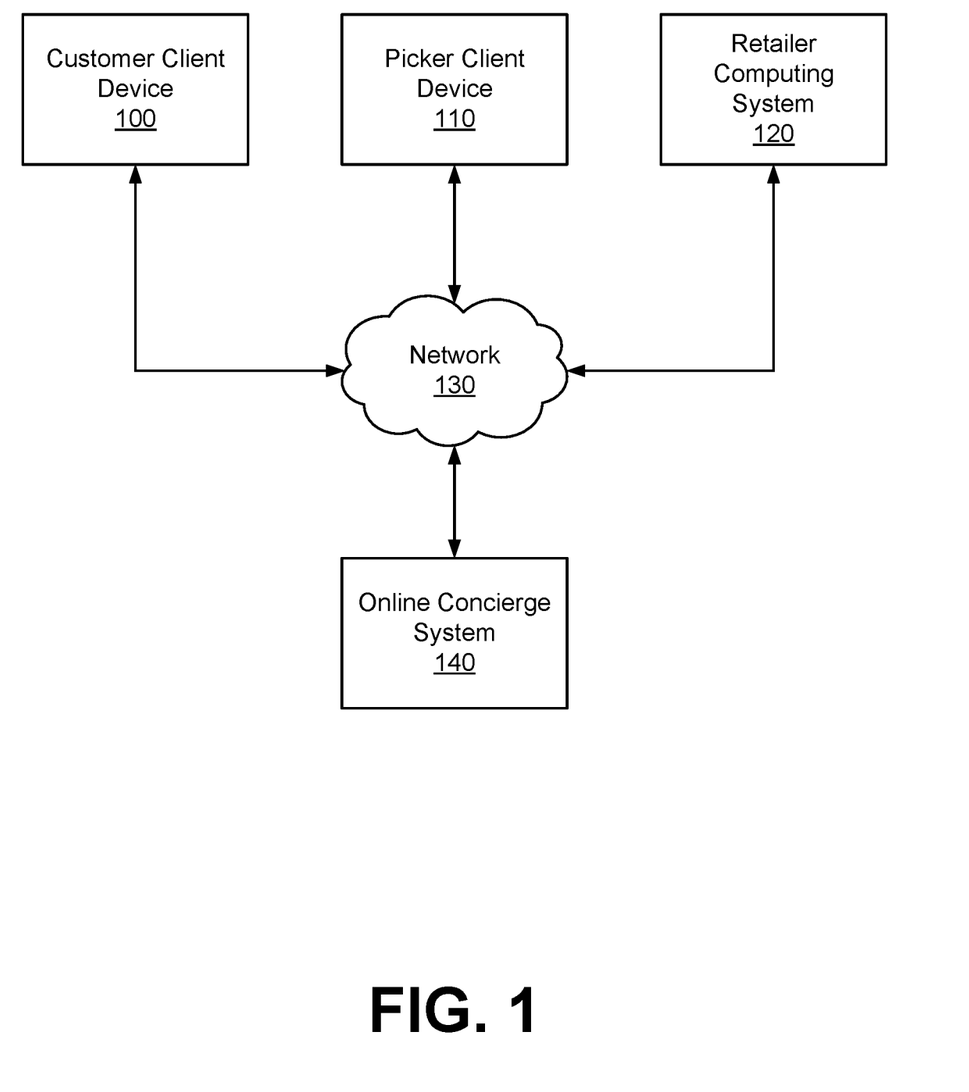
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
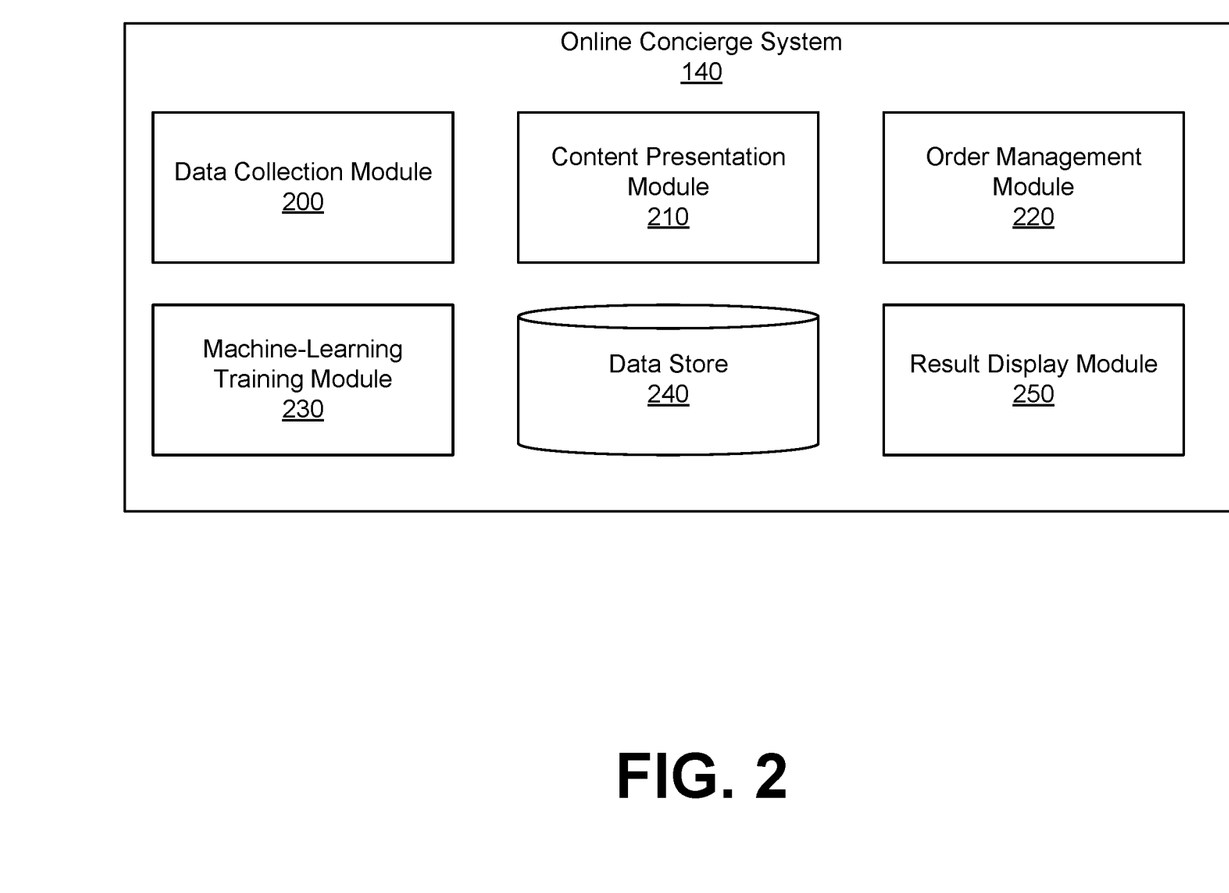
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240, and a result display module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140.

The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The result display module 250 displays items to a user based on relevance and personalization scores for the items. A relevance score is a score that represents how relevant an item is to the customer's search query, and a personalization score is a score representing an affinity of the item to the customer who submitted the search query. Relevance and personalization scores may be based on item data, user data, or query data. In some embodiments, item data may include an item embedding, user data may include a user embedding, or query data may include a query embedding. In some embodiments, the result display module 250 receives a search query from a user of the online concierge system 140 and generates a query embedding for the search query. The result display module 250 accesses a set of candidate items and accesses an item embedding for each candidate item in the set. The result display module 250 computes a relevance score for each candidate item based on the corresponding item embedding and the query embedding of the search query. The result display module 250 computes a personalization score for each candidate item based on an item embedding corresponding to the candidate item and a user embedding corresponding to the user. The result display module 250 adjusts the personalization score based on a query specificity score. The result display module 250 combines the relevance score and adjusted personalization score for each candidate item into a ranking score such that the ranking scores can be used to rank the candidate items against one another. The result display module 250 may display the candidate items based on their ranking scores. Further details of the method of displaying items are discussed in FIG. 3.

Figure 3:
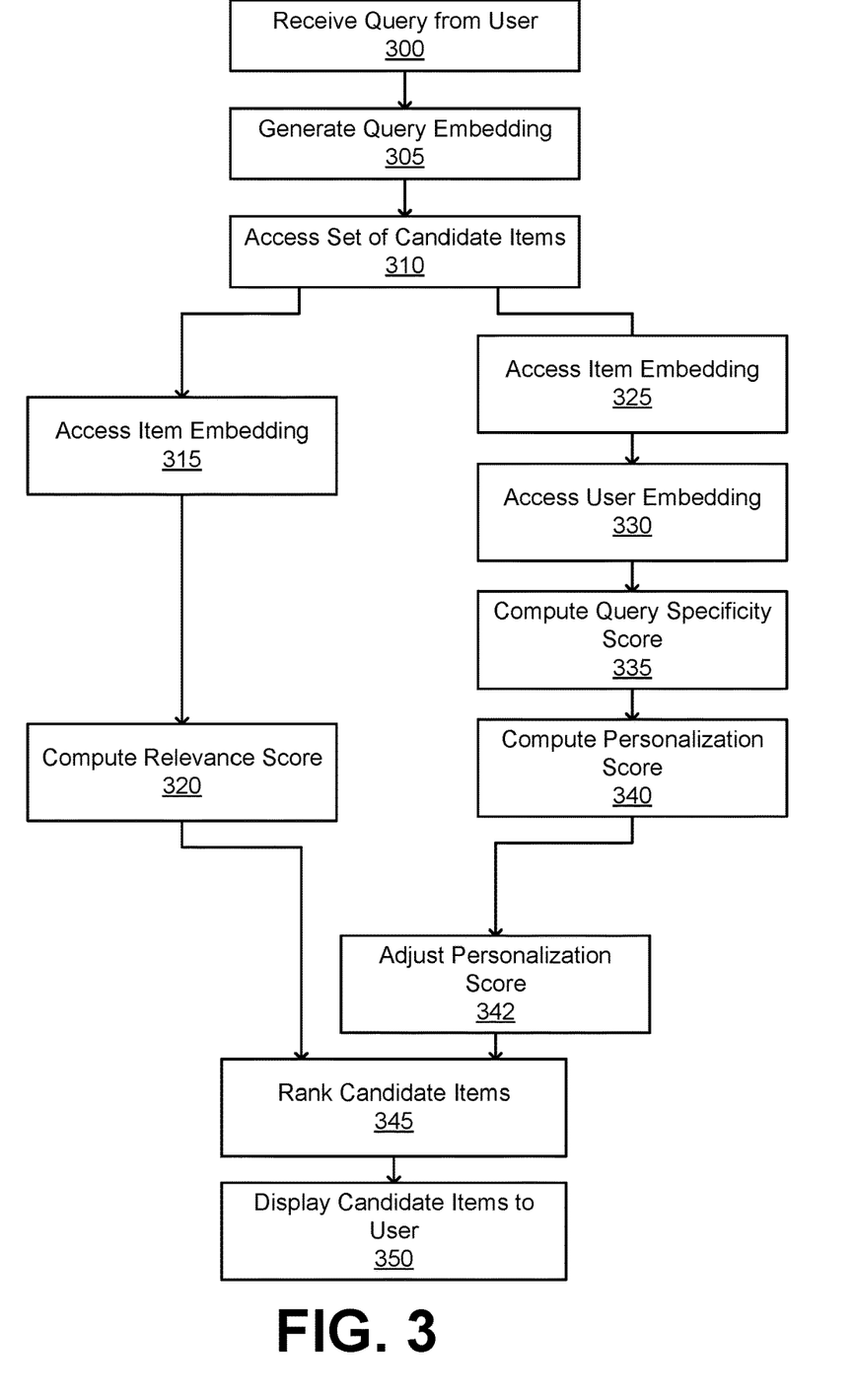
FIG. 3 is a flowchart for a method of ranking items to be shown on display to a consumer, in accordance with one or more embodiments.

FIG. 3 is a flowchart illustrating a method of displaying items to a user based on relevance scores and personalization scores for the items, in accordance with some embodiments. Alternative embodiments may include more, fewer, or different steps from those illustrated in FIG. 3, and the steps may be performed in a different order from that illustrated in FIG. 3. These steps may be performed by any online system, for example, online concierge system 140, an online social networking system, or a video content search system. Additionally, each of these steps may be performed automatically by the online system without human intervention.

The online concierge system 140 receives 300 a search query from the customer client device corresponding to the customer. A search query is free text for a word or set of words that indicate items of interest to the customer. For example, if a customer wants to be presented with sourdough bread items, the customer may provide "sourdough" or "sourdough bread" as free text for a search query. In some embodiments, the search query includes customer data describing characteristics of the customer or item data describing characteristics of items that the customer has added to their shopping list. For example, the search query may include a customer identifier identifying the customer who generated the search query or item identifiers identifying the items added to the customer's shopping list.

The online concierge system 140 generates 305 a query embedding for the search query. A query embedding is an embedding describing characteristics of a search query. The online concierge system 140 generates the query embeddings by applying a query embedding model to the free text of the search query. A query embedding model is a machine-learning model that is trained to generate query embeddings in a latent space based on free text from search queries.

The online concierge system 140 accesses 310 a set of candidate items stored by the online concierge system 140. The set of candidate items are items that the online concierge system 140 considers for possible presentation to the customer as search query results. The online concierge system 140 may access the set of candidate items by accessing a set of items stored in data store 240. In some embodiments, the online concierge system 140 filters a broader set of items to generate the set of candidate items. For example, if the search query is searching for items at a particular retailer, the online concierge system 140 may filter out items that are not available at a retail location at which the order would be serviced.

The online concierge system 140 computes a relevance score for each of the candidate items in the set of candidate items. A relevance score is a score that represents how relevant an item is to the customer's search query. For example, if a customer search query is for "gluten free sourdough bread," the online concierge system 140 may compute a relevance score for a gluten-free sourdough item that is higher than a relevance score computed for a regular sourdough item.

In some embodiments, to compute a relevance score for an item, the online concierge system 140 accesses 315 an item embedding for the item. The item embedding is an embedding describing characteristics of the item in the set of candidate items. The online concierge system 140 may generate item embeddings for items by applying an item embedding model to item data describing an item. The item embedding model is a machine-learning model that is trained to generate item embeddings based on item data. The online concierge system 140 may access pre-generated item embeddings that are stored by the online concierge system 140. Alternatively, the online concierge system 140 may generate an item embedding for a candidate item in response to receiving the search query from the user.

The online concierge system 140 computes 320 a relevance score for a candidate item based on query data and item data. In some embodiments, the online concierge system 140 computes 320 a relevance score for a candidate item based on the query embedding and the item embedding for the candidate item. For example, the online concierge system 140 may compute the relevance score for an item by computing a dot product of the query embedding and the item embedding. In some embodiments, the relevance score is a combination (e.g., a linear combination) of multiple values. For example, the online concierge system 140 may combine an initial score (e.g., dot product) computed based on the item embedding and the query embedding with item metrics to compute a relevance score for the candidate item. For example, the relevance score may be computed based on item metrics such as how often customers order a candidate item when presented with the item, how often and in what capacity customers interact with the candidate item (e.g., clicked on, added to cart), how often customers order the item after having ordered the item in the past, or other item metrics such as the time an item spends on the customer's display. In some embodiments, the online concierge system 140 normalizes the computed relevance score for each candidate item based on the raw relevance scores computed for the full set of candidate items or normalizes the individual values that are combined to compute the relevance score against the raw individual values computed for the full set of candidate items.

The online concierge system 140 also computes a personalization score for each of the candidate items. A personalization score is a score representing an affinity of the item to the customer who submitted the search query. For example, if a customer has previously ordered sourdough bread items, the online concierge system 140 may compute a personalization score for a sourdough bread item that is higher than the personalization score for a different type of bread item, for example a rye bread item.

In some embodiments, to compute a personalization score for an item, the online concierge system 140 accesses 325 an item embedding for the item. In some embodiments, an item embedding used in computing the relevance score is the same as the item embedding used in computing the personalization score. Alternatively, the item embedding used in computing the relevance score may be different from the item embedding used in computing the personalization score. For example, for the same item, a first machine-learning model may generate a first item embedding in a first latent space to compute the relevance score and a second machine-learning model may generate a second item embedding in a second latent space to compute the personalization score.

In some embodiments, the online concierge system 140 accesses 330 a user embedding for the customer. A user embedding is an embedding describing characteristics of a user. The online concierge system generates the user embeddings by applying a user embedding model to customer data describing a user. The user embedding model is a machine-learning model that is trained to generate user embeddings based on user data.

The online concierge system 140 computes 335 a query specificity score for the search query. A query specificity score represents how specific or generic the search query is. For example, the online concierge system may compute a lower query specificity score for a relatively less specific search query such as "snacks" while the online concierge system may compute a higher query specificity score for a relatively more specific search query such as "organic cheddar cheese crackers." The online concierge system 140 may compute 335 the query specificity score based on different measures of specificity.

In some, the online concierge system 140 measures the specificity of a search query with a machine learning model trained on a set of example queries with manually labeled specificity values. In some embodiments, the online concierge system 140 measures the specificity based on the amount of words included in the free-text of the search query or based on the length of the free-text of the search query.

In some embodiments, the online concierge system 140 computes 335 the specificity of a search query by computing an entropy score for the search query. The entropy score functions as an inverse measure of specificity for the search query and, as such, its inverse may be used as the query specificity score. The online concierge system 140 may compute the entropy score by computing, for a set of possible interaction outcomes from the search query, an uncertainty of which interaction outcomes may result. An interaction outcome is an outcome that represents an interaction between a customer and an item presented in search results for the search query. An uncertainty in interaction outcomes may be based on historical data, such as data describing which items customers with the same or similar queries have interacted with in the past, or data showing the rate at which customers have interacted with a particular item when it has been presented in response to a search query. The online concierge system 140 computes the entropy score using probabilities that a customer will interact with an item, given a search query, where the online concierge system 140 computes the probabilities based on historical data. For example, the online concierge system 140 may compute the entropy score based on the following formula:

$$E = -\sum_i P(s)\log(P(s))$$

for all items i in a set of candidate items, where $$P(s) = \frac{C(s)}{C(i)}$$

where s is defined to be the item search query interaction.

By using this formula, the online concierge system 140 computes the probability that, given a search query s, a customer will interact with an item, P(s), by taking the number of times customers have interacted with the item based on the search query, C(s), and dividing it by the number of times the item has been offered as a result of the search query, C(i). The online concierge system 140 takes the log of the probability, log(P(s)), and multiplies it by the probability itself, P(s). The online concierge system repeats the computation across all candidate items, i, sums those computations, then uses the negative of the sum as the entropy score, E.

Figure 4A:
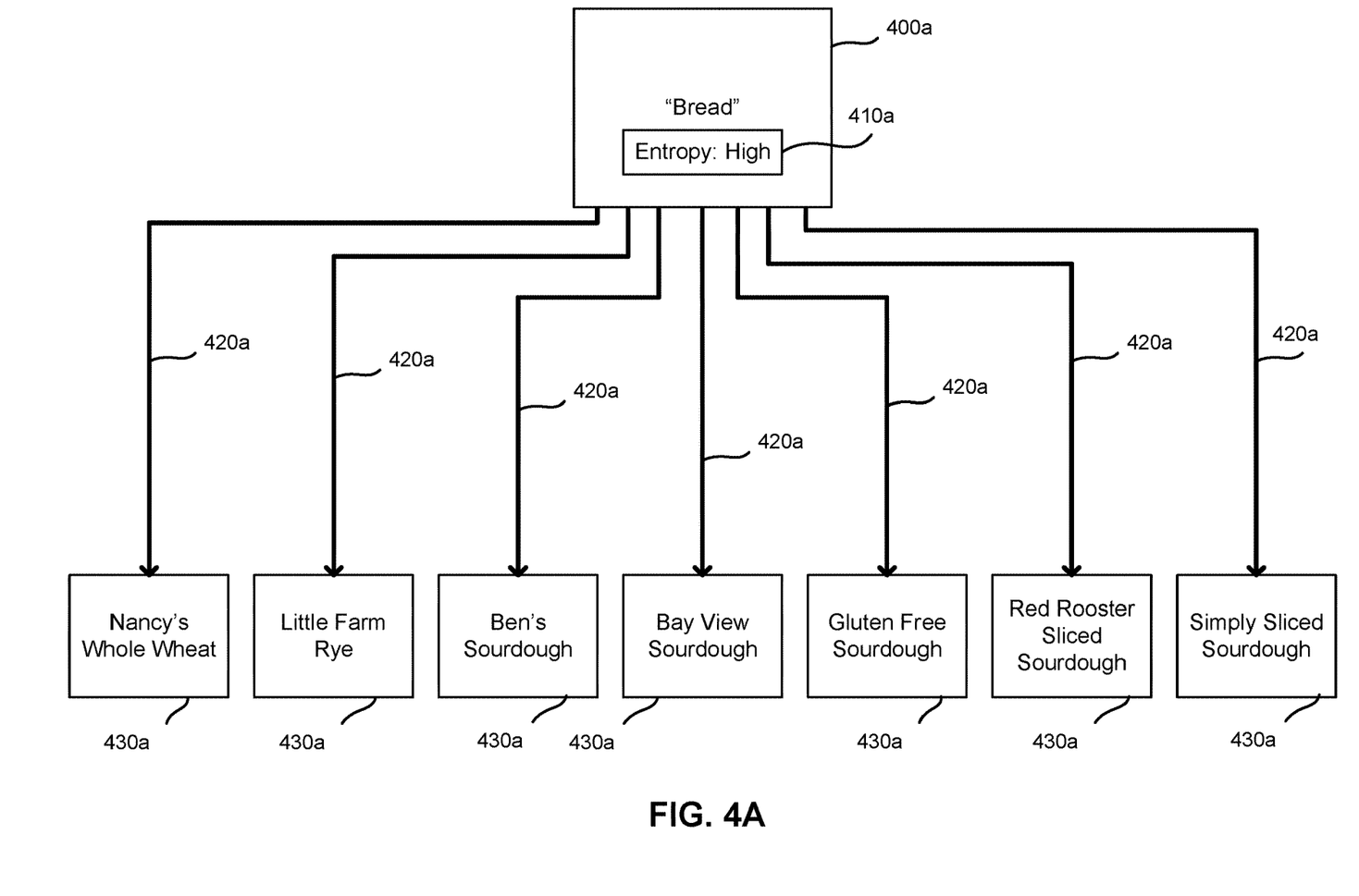
FIGS. 4A-C illustrate how entropy scores are computed for search queries based on an uncertainty of interaction outcomes, in accordance with one or more embodiments.
Figure 4B:
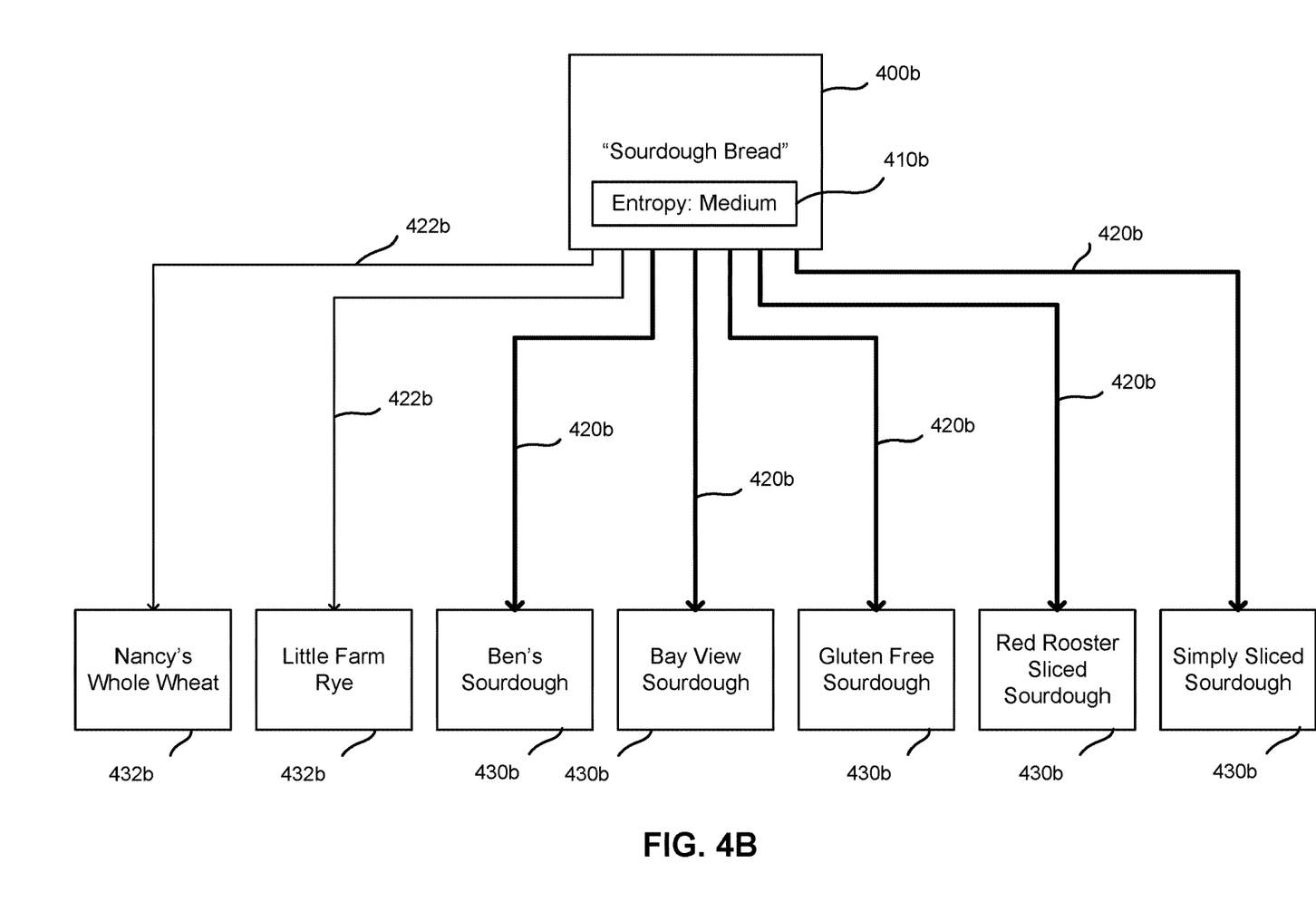
Figure 4C:
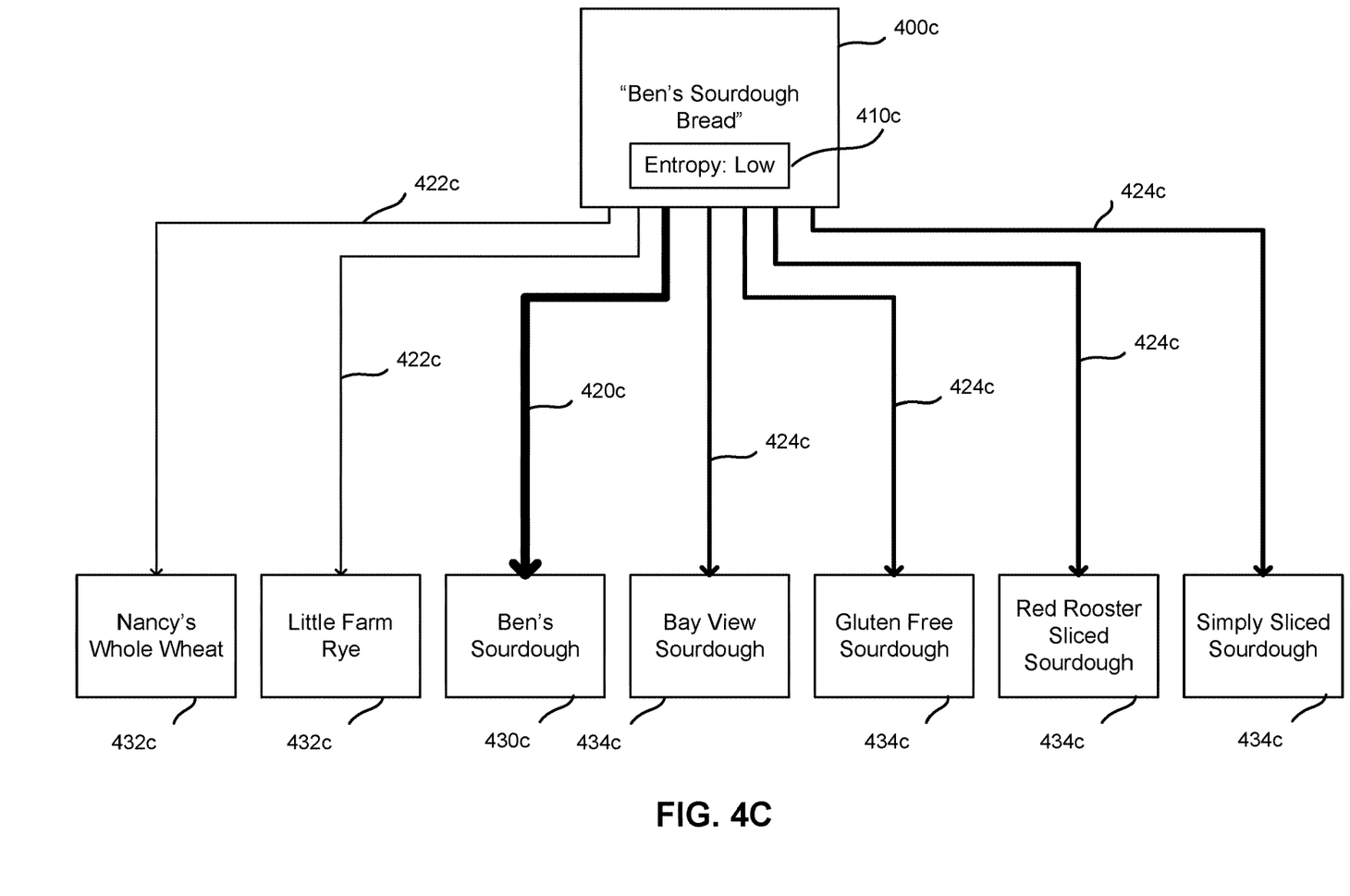

FIGS. 4A-C illustrate how entropy scores are computed for search queries based on an uncertainty of interaction outcomes, in accordance with some embodiments. FIGS. 4A-C each illustrate an example of a search query 400 with entropy score 410 and candidate items 430. A connection 420 between the search query 400 and a candidate item 430, represented as a line, indicates a potential interaction between the customer and the candidate item, where a thicker line corresponds to a higher number of historical interactions between customers and the candidate item, in response to the search query. In the example shown in FIG. 4A, the search query 400*a* is for "bread." This search query has low specificity, and thus customers that provide this search query are likely providing the search query without a particular item in mind. As such, customers, in response to search query 400*a*, have not historically interacted with a single candidate item 430*a* over another, as shown by connections 420*a* having the same thickness. Thus, the online concierge system 140 computes a high entropy score 410*a* for the search query "bread."

In the example shown in FIG. 4B, the search query 400*b* is for "sourdough bread." This search query has a higher level of specificity than search query 400*a*, "bread", so customers that provide this search query may be providing the search query with some idea of the item they have in mind (i.e., they know they want sourdough bread over, say, multigrain bread). As such, customers, in response to the search query 400*b*, have historically interacted with some items over others, as shown by connections 420*b* and 422*b* having different thicknesses. Interactions with items 432*b*, "Nancy's Whole Wheat" and "Little Farm Rye," have low numbers of historical interactions. Interactions with candidate items 430*b*, all sourdough breads, have higher numbers of historical interactions. Thus, the online concierge system 140 computes a medium entropy score 410*b* for the search query "sourdough bread."

In the example shown in FIG. 4C, the search query 400*c* is for "Ben's sourdough bread." This search query has a high level of specificity, thus customers that provide this search query may be providing the search query with a particular item in mind. As such, customers, in response to the search query 400*c*, have historically interacted with one item strongly over others, as shown by connections 420*c*, 422*c*, and 424*c* having different thicknesses. Interactions with items 432*c*, non-sourdough bread, have low numbers of historical interactions. Interactions with candidate items 434*c*, sourdough breads with brands other than "Ben's," have numbers of historical interactions higher than candidate items 432*c* but lower than candidate item 430*c*. The interaction with candidate item 430*c*, "Ben's Sourdough Bread," has the highest number of historical interactions, as indicated by the thickest connection 420*c*. Thus, the online concierge system 140 computes a low entropy score 410*c* for the search query "Ben's sourdough bread."

The online concierge system 140 computes 340 a personalization score based on user data and item data. In some embodiments, the online concierge system 140 computes 340 a personalization score based on the user embedding and the item embedding. For example, the online concierge system 140 may compute the personalization score based on the dot product of the user embedding and the item embedding. In some embodiments, the personalization score is a combination (e.g., a linear combination) of multiple values. For example, the online concierge system 140 may combine an initial score (e.g., dot product) computed based on the item embedding and the user embedding with additional metrics, for example, metrics indicating that a user has added the item to a favorites list.

The online concierge system 140 adjusts 342 the personalization score based on the computed query specificity score. For example, if the query specificity score is low, indicating that the search query is less specific, the online concierge system 140 may adjust the personalization score to be higher. Similarly, if the computed query specificity score is high, indicating that the search query is more specific, the online concierge system 140 may adjust the personalization score to be lower.

The online concierge system 140 ranks 345 each candidate item of the set of candidate items by computing a ranking score for each item based on the relevance score and adjusted personalization score of each item. The ranking score for an item may be a sum, product, or weighted sum of the relevance score and adjusted personalization score for each item.

Online concierge system 140 displays 350 candidate items to the user based on the ranking. The online concierge system 140 may display candidate items that are higher in the ranking more prominently than items that are lower in the ranking. For example, the online concierge system 140 may display candidate items in the order of their rankings, with higher ranked candidate items at the top of the display.

Figure 5A:
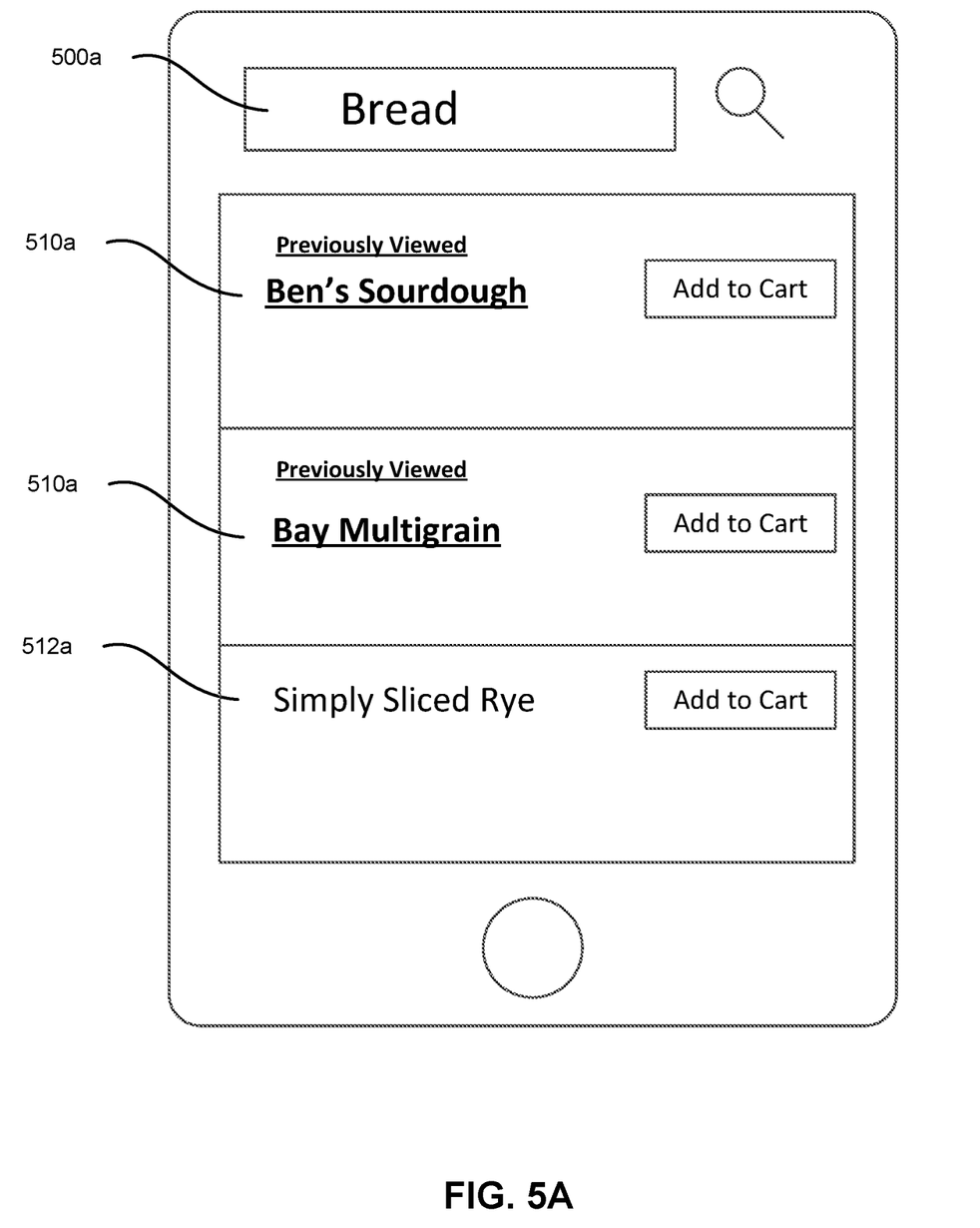
FIGS. 5A-B illustrate example user interfaces for presenting search results in response to a search query, in accordance with one or more embodiments.
Figure 5B:
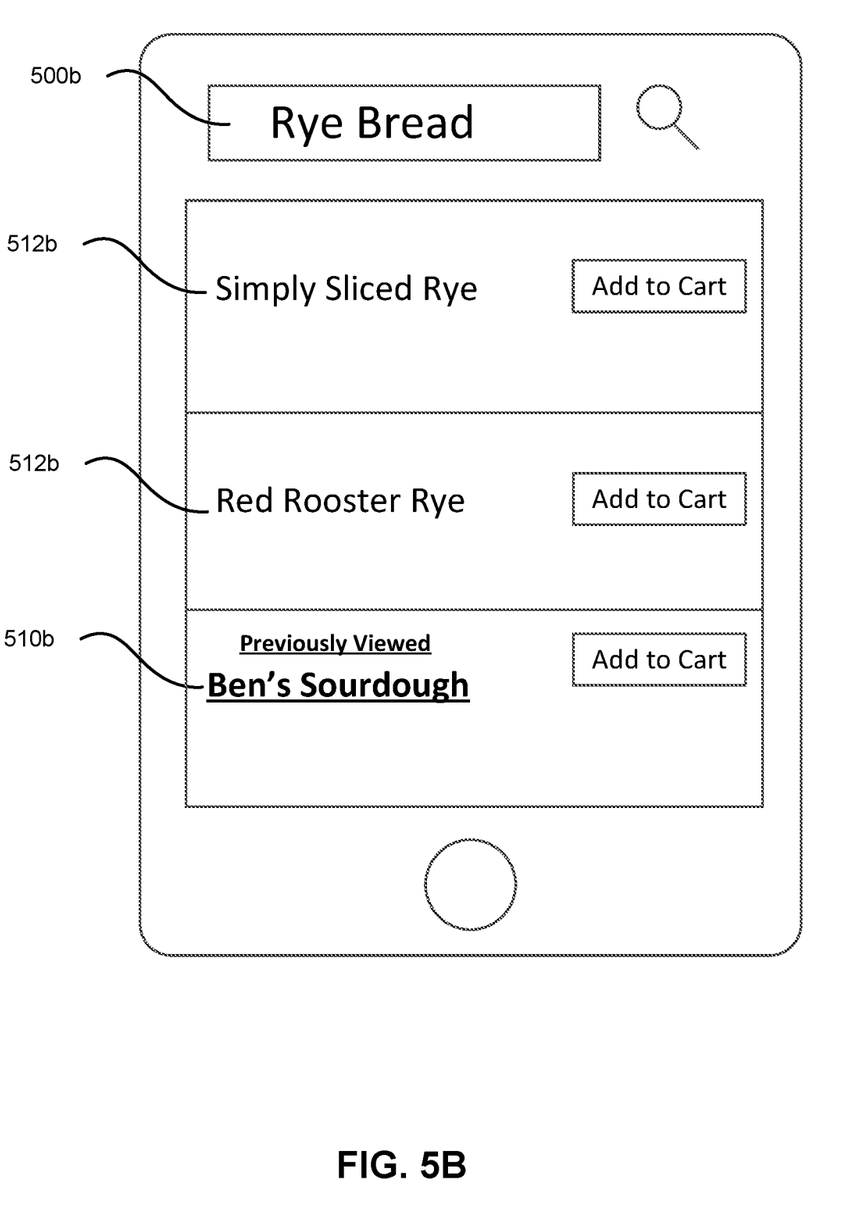

FIGS. 5A-B illustrate an example user interface for presenting search results in response to a search query, in accordance with some embodiments. FIG. 5A shows a less specific search query 500*a* as well as previously viewed candidate items 510*a*, and candidate item 512*a*. FIG. 5B shows a more specific search query 500*b* as well as previously viewed candidate item 510*b*, and candidate items 512*b*.

In the example in FIG. 5A, the search query 500*a*, "bread," is a less specific search query and thus has a low query specificity score. Because the search query has a low query specificity score, the online concierge system 140 weights the personalization score of each candidate item more highly than the relevance score of each candidate item. As such, the online concierge system 140 more prominently displays more personalized items, such as previously viewed candidate items 510a.

In the example in FIG. 5B, the search query 500b, "rye bread" is a more specific search query and thus has a high query specificity score. Because the search query has a high query specificity score, the online concierge system 140 weights the personalization score of each candidate item lower, and more prominently displays items more relevant to the search query, even though they are less personalized (see candidate item 512b, "Simply Sliced Rye," shown more prominently than previously viewed candidate item 510b, "Ben's Sourdough").

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
   receiving a query from a user device corresponding to a user of an online concierge system, wherein the query includes free text;
   generating a query embedding for the query by applying a query embedding model to the free text of the query, wherein the query embedding model is a machine-learning model that is trained to generate query embeddings based on free text from queries;
   accessing a set of candidate items;
   computing a relevance score for each candidate item of the set of candidate items, wherein computing a relevance score for a candidate item comprises:
      accessing an item embedding for the candidate item stored by the online concierge system, wherein the item embedding is generated by a first item embedding model that is trained to generate item embeddings based on item data; and
      computing the relevance score for the candidate item based on the query embedding and the item embedding;
   computing a personalization score for each candidate item of the set of candidate items, wherein computing the personalization score for a candidate item comprises:
      accessing a user embedding associated with the user, where the user embedding is stored by the online concierge system, and wherein the user embedding is generated by a user embedding model that is trained to generate user embeddings based on user data;
      accessing an item embedding for the candidate item stored by the online concierge system, wherein the item embedding is generated by a second item embedding model that is trained to generate item embeddings based on item data; and computing the personalization score for the candidate item based on the user embedding and the item embedding;

computing a query specificity score for the query, wherein the query specificity score is computed based on an entropy score for the query, wherein the entropy score describes historical user interactions with items in search results and represents, for a set of possible interaction outcomes, an uncertainty in which interaction outcome may result from the query, wherein an interaction outcome represents a user interaction with an item presented in search results for the query;

adjusting the personalization score for each candidate item of the set of candidate items based on the query specificity score;

computing a ranking score for each candidate item of the set of candidate items, wherein the ranking score for a candidate item is computed based on the relevance score for each candidate item and the adjusted personalization score for each candidate item;

ranking the candidate items based on the ranking scores; and transmitting the set of candidate items for display on the user device based on the ranking.

2. The method of claim 1, wherein accessing a set of candidate items comprises:
filtering a set of possible items based on item availability to generate the set of candidate items.

3. The method of claim 1, wherein computing the relevance score comprises:
computing the relevance score based on item metrics describing at least one of how often users order a candidate item when presented with the item or how often users order the item after having previously ordered the item.

4. The method of claim 3, wherein computing a relevance score comprises:
computing a linear combination of the item metrics and a score computed based on the query embedding and the item embedding.

5. The method of claim 3, wherein computing the relevance score comprises:
normalizing item metrics based on the item metrics for each item in the set of candidate items.

6. The method of claim 1, wherein computing the relevance score for a candidate item comprises:
normalizing the relevance score for the candidate item based on relevance scores computed for each item in the set of candidate items.

7. The method of claim 1, wherein the first item embedding model is the same as the second item embedding model.

8. The method of claim 1, wherein computing the entropy score comprises:
computing a probability that a user will interact with an item, given a search query.

9. The method of claim 1, wherein computing the ranking score for a candidate item comprises:
computing a linear combination of the relevance score and the personalization score.

10. The method of claim 1, wherein transmitting the set of candidate items for display on the user device based on the ranking comprises:
transmitting candidate items with higher rankings for display at a top of a display of the user device.

11. A non-transitory computer-readable medium storing instructions that, when executed by a processor, cause the processor to:
receive a query from a user device corresponding to a user of an online concierge system, wherein the query includes free text;
generate a query embedding for the query by applying a query embedding model to the free text of the query, wherein the query embedding model is a machine-learning model that is trained to generate query embeddings based on free text from queries;
access a set of candidate items;
compute a relevance score for each candidate item of the set of candidate items, wherein computing a relevance score for a candidate item comprises:
accessing an item embedding for the candidate item stored by the online concierge system, wherein the item embedding is generated by a first item embedding model that is trained to generate item embeddings based on item data; and
computing the relevance score for the candidate item based on the query embedding and the item embedding;
compute a personalization score for each candidate item of the set of candidate items, wherein computing the personalization score for a candidate item comprises:
accessing a user embedding associated with the user, where the user embedding is stored by the online concierge system, and wherein the user embedding is generated by a user embedding model that is trained to generate user embeddings based on user data;
accessing an item embedding for the candidate item stored by the online concierge system, wherein the item embedding is generated by a second item embedding model that is trained to generate item embeddings based on item data; and
computing the personalization score for the candidate item based on the user embedding and the item embedding;
compute a query specificity score for the query, wherein the query specificity score is computed based on an entropy score for the query, wherein the entropy score describes historical user interactions with items in search results and represents, for a set of possible interaction outcomes, an uncertainty in which interaction outcome may result from the query, wherein an interaction outcome represents a user interaction with an item presented in search results for the query;
adjust the personalization score for each candidate item of the set of candidate items based on the query specificity score;
compute a ranking score for each candidate item of the set of candidate items, wherein the ranking score for a candidate item is computed based on the relevance score for each candidate item and the adjusted personalization score for each candidate item;
rank the candidate items based on the ranking scores; and
transmit the set of candidate items for display on the user device based on the ranking.

12. The computer-readable medium of claim 11, wherein the instructions for accessing a set of candidate items comprise instructions that cause the processor to:
filter a set of possible items based on item availability to generate the set of candidate items.

13. The computer-readable medium of claim 11, wherein the instructions for computing the relevance score comprise instructions that cause the processor to:

compute the relevance score based on item metrics describing at least one of how often users order a candidate item when presented with the item or how often users order the item after having previously ordered the item.

14. The computer-readable medium of claim 13, wherein the instructions for computing the relevance score comprise instructions that cause the processor to:
   compute a linear combination of the item metrics and a score computed based on the query embedding and the item embedding.

15. The computer-readable medium of claim 13, wherein the instructions for computing the relevance score comprise instructions that cause the processor to:
   normalize item metrics based on the item metrics for each item in the set of candidate items.

16. The computer-readable medium of claim 11, wherein the instructions for computing the relevance score for a candidate item comprise instructions that cause the processor to:
   normalize the relevance score for the candidate item based on relevance scores computed for each item in the set of candidate items.

17. The computer-readable medium of claim 11, wherein the first item embedding model is the same as the second item embedding model.

18. The computer-readable medium of claim 11, wherein the instructions for computing the entropy score comprise instructions that cause the processor to:
   compute a probability that a user will interact with an item, given a search query.

19. The computer-readable medium of claim 11, wherein the instructions for computing the ranking score for a candidate item comprise instructions that cause the processor to:
   compute a linear combination of the relevance score and the personalization score.

20. A system comprising:
   a processor; and
   a non-transitory computer-readable medium storing instructions that, when executed by a processor, cause the processor to:
      receive a query from a user device corresponding to a user of an online concierge system, wherein the query includes free text;
      generate a query embedding for the query by applying a query embedding model to the free text of the query, wherein the query embedding model is a machine-learning model that is trained to generate query embeddings based on free text from queries;
      access a set of candidate items;
      compute a relevance score for each candidate item of the set of candidate items, wherein computing a relevance score for a candidate item comprises:
         accessing an item embedding for the candidate item stored by the online concierge system, wherein the item embedding is generated by a first item embedding model that is trained to generate item embeddings based on item data; and
         computing the relevance score for the candidate item based on the query embedding and the item embedding;
      compute a personalization score for each candidate item of the set of candidate items, wherein computing the personalization score for a candidate item comprises:
         accessing a user embedding associated with the user, where the user embedding is stored by the online concierge system, and wherein the user embedding is generated by a user embedding model that is trained to generate user embeddings based on user data;
         accessing an item embedding for the candidate item stored by the online concierge system, wherein the item embedding is generated by a second item embedding model that is trained to generate item embeddings based on item data; and
         computing the personalization score for the candidate item based on the user embedding and the item embedding;
      compute a query specificity score for the query, wherein the query specificity score is computed based on an entropy score for the query, wherein the entropy score describes historical user interactions with items in search results and represents, for a set of possible interaction outcomes, an uncertainty in which interaction outcome may result from the query, wherein an interaction outcome represents a user interaction with an item presented in search results for the query;
      adjust the personalization score for each candidate item of the set of candidate items based on the query specificity score;
      compute a ranking score for each candidate item of the set of candidate items, wherein the ranking score for a candidate item is computed based on the relevance score for each candidate item and the adjusted personalization score for each candidate item;
      rank the candidate items based on the ranking scores; and
      transmit the set of candidate items for display on the user device based on the ranking.

* * * * *